(12) United States Patent
Schultz et al.

(10) Patent No.: US 9,885,387 B2
(45) Date of Patent: Feb. 6, 2018

(54) RUBBER-SOLID MATERIAL BEARING FOR ARRANGING ON A MOTOR VEHICLE AXLE

(71) Applicant: BENTELER Automobiltechnik GmbH, Paderborn (DE)

(72) Inventors: Erik Schultz, Paderborn (DE); Peter Koczar, Wiesbaden (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 15/181,719

(22) Filed: Jun. 14, 2016

(65) Prior Publication Data

US 2016/0377118 A1    Dec. 29, 2016

(30) Foreign Application Priority Data

Jun. 15, 2015 (DE) .................. 10 2015 109 533

(51) Int. Cl.
*F16C 27/06* (2006.01)
*F16F 1/373* (2006.01)
(Continued)

(52) U.S. Cl.
CPC ............ *F16C 27/063* (2013.01); *B60G 21/05* (2013.01); *F16F 1/3732* (2013.01); *F16F 1/40* (2013.01); *F16F 1/403* (2013.01); *B60G 21/051* (2013.01); *B60G 2200/30* (2013.01); *B60G 2200/462* (2013.01); *B60G 2204/41* (2013.01);
(Continued)

(58) Field of Classification Search
CPC ........ F16C 27/063; F16C 17/02; F16C 35/02; F16C 2326/05; F16F 1/38; F16F 1/40; B60G 21/05; B60G 21/051; B60G 21/052; B60G 2200/20; B60G 2200/30;
(Continued)

(56) References Cited

U.S. PATENT DOCUMENTS 2,117,264 A * 5/1938 Workman ............. F16F 1/3732
                                                    267/141.1
2,477,972 A    8/1949 Efromson et al.
(Continued)

FOREIGN PATENT DOCUMENTS

CN    203666303 U  *  6/2014
DE       1635087 U    2/1952
(Continued)

OTHER PUBLICATIONS

EP—2497660 A1, English machined translation of description.*
Japanese Patent Office Action for No. 2016-117796 dated Sep. 6, 2017, 4 pages.

*Primary Examiner* — Robert A Siconolfi
*Assistant Examiner* — San Aung
(74) *Attorney, Agent, or Firm* — Hauptman Ham, LLP

(57) ABSTRACT

The invention relates to a motor vehicle axle, in particular a torsion beam axle, the rubber-solid material bearing being constructed in a disk-like manner from at least two disks made from solid material with a rubber layer which is arranged in between, and is characterized according to the invention in that a disk which is arranged on the outside in relation to the axial direction A of the rubber-solid material bearing has a collar which is oriented so as to stand upright toward the outside.

9 Claims, 6 Drawing Sheets

Figure 1:
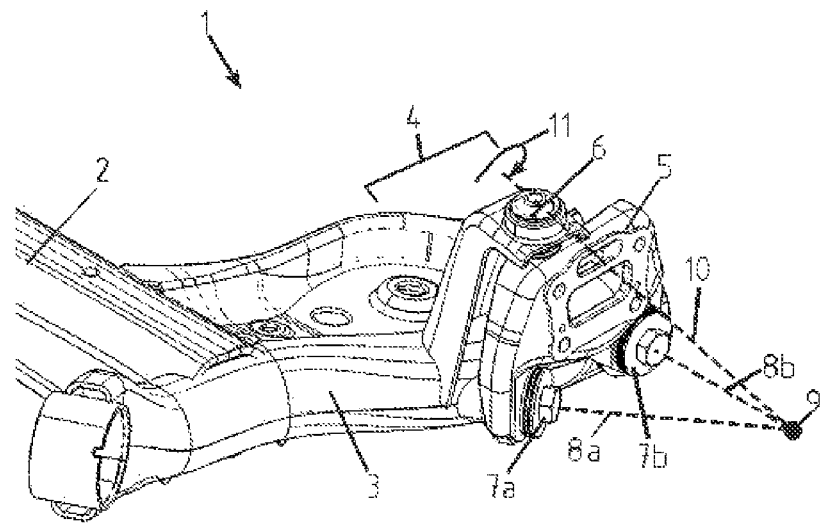

(51) Int. Cl.
*F16F 1/40* (2006.01)
*B60G 21/05* (2006.01)

(52) U.S. Cl.
CPC .. *B60G 2204/4106* (2013.01); *B60G 2206/20* (2013.01); *B60G 2206/50* (2013.01)

(58) Field of Classification Search
CPC .......... B60G 2200/462; B60G 2204/41; B60G 2204/4106; B60G 2206/20; B60G 2206/50
USPC ........................................................ 267/292
See application file for complete search history.

(56) References Cited

U.S. PATENT DOCUMENTS

| | | | | |
|---|---|---|---|---|
| 2,749,114 | A * | 6/1956 | Withall | F16F 1/403 213/40 S |
| 2,926,881 | A * | 3/1960 | Painter | F16F 1/3732 267/141.4 |
| 3,976,338 | A * | 8/1976 | Trachte | B60G 7/02 267/279 |
| 4,211,429 | A * | 7/1980 | Howard | B60G 11/62 267/219 |
| 4,513,990 | A * | 4/1985 | Morita | B60G 7/02 267/153 |
| 5,224,783 | A | 7/1993 | Schmidt et al. | |
| 5,246,242 | A | 9/1993 | Penzotti | |
| 5,641,153 | A * | 6/1997 | Gwinn | B60G 13/02 267/140.13 |
| 2010/0059470 | A1 * | 3/2010 | Carlstedt | B61G 9/06 213/40 R |
| 2010/0084797 | A1 * | 4/2010 | Kawada | F16F 1/40 267/140.12 |
| 2012/0013095 | A1 | 1/2012 | Gerrard | |
| 2012/0326366 | A1 * | 12/2012 | Kawada | F16F 1/40 267/140.5 |
| 2013/0001915 | A1 * | 1/2013 | Yamada | F16F 1/3876 280/124.177 |

FOREIGN PATENT DOCUMENTS

| | | |
|---|---|---|
| DE | 885032 C | 7/1953 |
| DE | 7325480 U | 10/1973 |
| DE | 4141463 A1 | 6/1993 |
| DE | 102013200524 A1 | 7/2014 |
| EP | 0520187 A1 | 12/1992 |
| EP | 1887248 A1 | 2/2008 |
| EP | 2497660 A1 | 9/2012 |
| FR | 1291303 A | 4/1962 |
| JP | H0682423 U | 11/1994 |
| JP | H07332341 A | 12/1995 |
| JP | H09217726 A | 8/1997 |
| JP | 2005265165 A | 9/2005 |
| WO | 2010034807 A1 | 4/2010 |

* cited by examiner

RUBBER-SOLID MATERIAL BEARING FOR ARRANGING ON A MOTOR VEHICLE AXLE

RELATED APPLICATIONS

The present application claims priority from German Application No. 10 2015 109 533.5, filed Jun. 15, 2015, the disclosure of which is hereby incorporated by reference herein in its entirety.

The present invention relates to a rubber-solid material bearing for arranging on a motor vehicle axle in accordance with the features in the preamble of Patent Claim 1.

It is known from the prior art that motor vehicle axles or wheel suspension systems are coupled kinematically to the motor vehicle in such a way that, during a compression operation, when driving around a bend or else during an initiated braking operation, the toe and camber setting of the wheel changes in a targeted manner, in order to positively influence the driving properties. It is thus particularly preferably desired that, when driving around a bend, the wheels on the outside of the bend, in particular the wheel of the rear axle which is on the outside of the bend, rotate/rotates into negative camber and/or positive toe, in order to increase the cornering force and therefore to avoid oversteer of the motor vehicle.

The prior art has disclosed, for example by way of EP 2 497 660 A1, a motor vehicle axle, the wheel suspension system of which is coupled elastokinematically to the longitudinal swing arm of a torsion beam axle, with the result that the abovementioned effects occur.

In order that elastokinematic coupling of this type can be performed, multiple disk bearings having a metal disk arrangement and rubber ring arrangement are known in the abovementioned document.

For example, DE 73 25 480 U has disclosed a rubber-solid material bearing which is configured in a disk-like manner from at least two disks made from solid material with a rubber layer which is arranged in between. A disk which lies on the outside has a collar which is oriented so as to stand upright toward the outside. DE 16 35 087 U, DE 885 032 B and U.S. Pat. No. 5,246,242 A have also disclosed rubber-solid material bearings of the type under discussion with a disk-like construction.

It is an object of the present invention to indicate an elastokinematic bearing, the durability of which is improved, which makes it possible to achieve elastokinematic properties which are desired in a targeted manner in relation to radial and axial rigidity, and at the same time makes a simple assembly operation possible.

According to the invention, the abovementioned object is achieved by way of a rubber-solid material bearing for arranging on a motor vehicle axle in accordance with the features in Patent Claim 1.

Advantageous design variants of the present invention are the subject matter of the dependent patent claims.

The rubber-solid material bearing according to the invention for arranging on a motor vehicle axle, in particular on a torsion beam axle, is constructed in a disk-like manner from at least two disks made from solid material with a rubber layer which is arranged in between. A disk which is arranged on the outside in relation to the axial direction of rubber-solid material bearing has a collar which is oriented so as to stand upright toward the outside. According to the invention, it is distinguished by the fact that the ratio of radial rigidity to axial rigidity lies in the range from 1:30 to 1:100.

The collar which is oriented so as to stand upright toward the outside is, in particular, punched out or flanged out or flanged over from the outer disk. In particular, the collar is at a 90° angle with respect to the disk plane of the solid material disk.

According to the invention, the collar affords the possibility that centering of the rubber-solid material bearing is made possible in an assembly opening during the assembly operation. In particular, a wheel suspension system or a wheel support is coupled by means of the rubber-solid material bearing to the axle, in particular to the longitudinal swing arm of the axle. The collar therefore makes positively locking centering possible, the collar being penetrated, in particular, by a threaded bolt. On account of the centering, it is firstly possible to facilitate the assembly operation, in particular during initial assembly. A faulty seat during assembly is avoided, with the result that it is ensured that the axle arrangement with the rubber-solid material bearing according to the invention is mounted in the correct position, and therefore the service life of the overall axle arrangement is increased considerably. As a result of the multiple-disk construction with a rubber coat which is arranged in between, in particular with a rubber layer which is arranged in between, it is possible to design the bearing in a requirement-specific manner, for example by way of the dimensioning of the rubber and solid material components and, furthermore, particularly preferably properties of the rubber coats.

In particular, the rubber-solid material bearing (also called a bearing in the following text) is constructed as a result in such a way that three disks are arranged spaced apart in parallel to one another, in each case one rubber layer being arranged between the disks. Therefore, three disks are arranged spaced apart from one another, and two rubber layers are arranged in between. The geometric ratio is configured, in particular, in such a way that the rubber layers have a width in the axial direction which is greater than the width of the disks.

In one preferred design variant, the spacings of all three disks from one another can be identical, as a result of which the width of the two rubber layers is also identical. However, it is also conceivable within the scope of the invention that the spacings between in each case two disks are different from one another. Therefore, the width of one rubber layer is smaller than that of the other rubber layer. This makes it possible in turn to realize, for example, a progressive or degressive rigidity profile of the bearing in the axial direction in a targeted manner.

Furthermore, the two disks which lie on the outside in the axial direction can particularly preferably in each case have a collar which is oriented so as to point toward the outside. The two collars are therefore oriented in opposite directions.

In particular, a metallic material, very particularly preferably a steel material, is used as solid material. However, the solid material can also be a plastic material. It is also conceivable within the scope of the invention that not only one disk is configured from plastic, but rather that, of the preferably three disks, one disk is configured from a different material. For example, the two outer disks can be configured from a metallic material, and the middle disk can be configured from plastic. It is also conceivable within the scope of the invention that the two outer disks are configured from plastic and the middle disk is configured from a metallic material.

The disks are, in particular, adhesively bonded to the respective rubber layer. However, it is also conceivable within the scope of the invention that the rubber layer is vulcanized onto the disk. A further manufacturing possibility for producing the rubber-solid material bearing consists in that the disks are cast into the rubber layers.

In order to avoid contamination, corrosion or premature detaching, it is provided, furthermore, that the disks are enclosed on the outer side, in particular completely, by a rubber jacket. Said rubber jacket prevents the penetration of dirt and moisture, in particular between the rubber layer and the disks, with the result that corrosion is avoided precisely in the case of disks made from a metallic material. Furthermore, no dirt particles can pass between the rubber layer and the disk, with the result that an abrasive effect as a result of penetrating dirt particles for detaching the rubber layer and the disk is correspondingly avoided between said rubber layer and said disk in the case of alternating stresses.

Moreover, the rubber jacket can exert a tensioning force precisely in the axial direction, with the result that the arrangement of disks and rubber layer cannot move apart from one another to a certain extent in the axial direction, for which reason detaching of the rubber layer and disks, in particular in the non-assembled state, is avoided.

Furthermore, the rubber layer is preferably likewise arranged on the inner circumferential face at an opening which penetrates the rubber-solid material bearing in the axial direction. Furthermore, the rubber layer covers the at least one collar which projects so as to be oriented toward the outside, in particular on an outer circumferential face. During an assembly operation, clamping either of the bearing in an assembly opening and/or a threaded bolt in the opening can therefore take place on the outer circumferential face of the collar and/or on the inner circumferential face of the opening, in turn simplifying the assembly operation.

By way of the collar which is, in particular, flanged over and/or collar which is configured in one piece and using the same material on a plastic disk, it is made possible that an additional positively locking element is produced between the rubber disk arrangement and the wheel bearing or a seat of the rubber bearing. Precisely when the elastokinematic movement is carried out on the axle arrangement which was mentioned at the outset, in particular a torsion beam axle, axial and radial fixing of the bearing is ensured by way of the collar. Slipping of the bearing on account of long-term alternating stresses is therefore avoided. The secure and correct bearing seat is also ensured over the service life of the motor vehicle, for which reason the service life of the rubber-solid material bearing is increased considerably.

In particular, it is conceivable, furthermore, that the rubber jacket is configured in one piece and from the same material as the rubber layer or the rubber layers. For example, the disks can be encapsulated, with the result that the rubber layer is formed between the disks and the rubber jacket is configured so as to enclose the entire solid material bearing and/or to penetrate the opening. It is also conceivable, however, that the rubber layer and the rubber jacket are applied in two operations which are different from one another and/or are configured from two different rubber materials. The rubber jacket affords the advantage, furthermore, that the bearing is adhesively bonded or vulcanized at its assembly location by means of the rubber jacket. Therefore, the correct seat of the bearing is ensured, furthermore.

The rubber-solid material bearing according to the invention is used particularly on a motor vehicle axle which is described in the following text. The motor vehicle axle is, in particular, a torsion beam axle which is configured from a torsion profile with longitudinal swing arms attached thereto, in each case one wheel suspension system being coupled at the free ends of the longitudinal swing arms via at least one elastic bearing, with the result that the wheel suspension system is coupled such that it can be pivoted about a virtual steering axis. According to the invention, the motor vehicle axle is distinguished by the fact that the wheel suspension system is coupled to the longitudinal swing arm via a steering knuckle with at least one degree of rotational freedom and via two rubber-solid material bearings, the degree of rotational freedom rotating about the virtual steering axis and the two rubber-solid material bearings being arranged in such a way that they form a spring centroid which lies outside the motor vehicle in relation to the motor vehicle coordinate system. The spring centroid and the steering knuckle define the steering axis.

Within the scope of the invention, the steering knuckle has exclusively degrees of rotational freedom, but only the degree of rotational freedom about the steering axis itself is necessary. In order to implement this function, a steering knuckle, a ball joint, a rubber bearing or else a different bearing with at least one degree of rotational freedom would be conceivable, for example. As a result, a real pivot point is fixed, about which the wheel suspension system and a wheel which is coupled thereto can be pivoted by way of the setting of toe and/or camber.

To this end, the rubber-solid material bearings preferably in each case have a longitudinal axis, the extension of the longitudinal axis approximately forming the abovementioned spring centroid. Therefore, the steering axis is defined between the steering knuckle and the spring centroid, which steering axis in turn particularly preferably intersects the wheel center point. This results in the possibility of realizing a passively actuated virtual steering axis on a motor vehicle axle, in particular on a rear torsion beam axle. The arrangement according to the invention is particularly distinguished by its simple construction, favorable production capability and particular freedom from maintenance during operation. Furthermore, the motor vehicle axle according to the invention is distinguished particularly by the fact that no relative toe correction takes place between the wheel suspension system and the longitudinal swing arm in the case of increased loading, for example of the boot, or else when driving through bumps, that is to say in the case of parallel compression of both wheels which are arranged on the axle.

According to the invention, the actual compression and rebound behavior, that is to say the suspension kinematics of the torsion beam axle, is retained. Here, a toe correction, in particular the relative toe correction between the wheel suspension system and the longitudinal swing arm which is possible as a result of the coupling according to the invention of the wheel suspension system to the longitudinal swing arm, is brought about virtually exclusively by way of the action of the braking force, that is to say by the action of force Fx in the X-direction of the motor vehicle, or else by way of cornering force action Fy, for example when driving around a bend.

A positive toe correction takes place during the action of braking forces, a standard braking maneuver when driving straight ahead bringing about a positive toe correction at both motor vehicle wheels of one axle. When driving around a bend, a positive toe correction once again takes place in the case of the outer wheel in the bend and possibly a negative toe correction in the case of the inner wheel in the bend. Said toe corrections take place substantially on account of the relative displacement between the wheel suspension system and the longitudinal swing arm. In general, the respective coupling kinematics of the torsion beam axle are also carried out during the respective maneuver.

In a further preferred design variant of the present invention, in relation to the motor vehicle coordinate system, the steering knuckle is arranged above the rubber-solid material bearing, preferably above the wheel center point. As a result, a profile of the virtual steering axis is ensured in such a way that it is oriented in the motor vehicle Z-direction and Y-direction in an analogous manner to negative camber and preferably has a negative caster in the motor vehicle Z-direction and X-direction. Furthermore, the virtual steering axis is preferably positioned in such a way that there is a negative trail at the respective wheel. It is likewise advantageous according to the invention if the virtual steering axis is positioned in such a way that there is a negative scrub radius at the respective wheel.

The steering knuckle is preferably configured as a ball joint. A ball joint has three degrees of rotational freedom, the degree of rotational freedom about the virtual steering axis being used substantially or else exclusively. For the lower rubber-solid material bearings, bearings with higher axial rigidity in relation to this and low radial rigidity relative thereto are used. On account of operation-induced wear of the rubber-solid material bearings over the duration of the operation of the motor vehicle, however, a ball joint additionally affords two further degrees of rotational freedom, with the result that tolerances or vibrations can be compensated for here, without a deflection or the like being avoided in comparison with a bearing with only one degree of rotational freedom. As a consequence, the system is low-wear and as a rule maintenance-free within a motor vehicle lifetime.

A ratio of radial rigidity to axial rigidity is selected in such a way that it lies in a range from 1:30 to 1:100, preferably from 1:30 to 1:55. Here, a low radial rigidity with an axial rigidity which is from 30 times to 50 times higher is to be considered to be within the ratio. In particular, the rigidity ratio can also be configured in the range between 1:35 and 1:45 or else, in particular, in the ratio of radial rigidity to axial rigidity of 1:40. The axial rigidity is preferably from 30 to 34 kN/mm, in particular 32 kN/mm, and the radial rigidity is from 400 N/mm to 800 N/mm, in particular 600 N/mm. This means that the axial rigidity is from 30 to 100 times higher than the radial rigidity.

Here, according to the invention, the axial rigidity increases progressively, in particular in the case of an increased action of force. In comparison with this, the radial rigidity runs virtually linearly with only a small increase. In particular, if the rubber-solid material bearings are installed in a prestressed manner, the radial rigidity to axial rigidity ratio can thus be increased. This ensures that the two rubber-solid material bearings, as elastic system, form a spring centroid, it being possible for the spring centroid to be considered to be a pivot point of the elastic system, via a low rotational rigidity of the replacement system. Here, the position of the spring centroid depends on the orientation of the elastic components, and the radial rigidity to axial rigidity ratio of the elastic components.

The two rubber-solid material bearings are preferably arranged below the steering knuckle, in relation to the motor vehicle coordinate system, particularly preferably below the wheel center. The reference below the wheel center once again does not mean, in relation to the motor vehicle coordinate system, that it lies vertically, that is to say in the Z-direction directly below the wheel center, but rather can also be arranged vertically below and horizontally offset with respect thereto. Furthermore, the rear rubber-solid material bearing in the main driving direction is preferably oriented with its longitudinal axis substantially parallel to the wheel rotational axis.

Furthermore, the rubber-solid material bearing which lies at the front in the driving direction is preferably arranged with its longitudinal axis at an angle $\alpha$ with respect to the wheel rotational axis, which angle a preferably lies in a range from 10° to 40°, in particular from 20° to 35° and preferably 30°.

In a further particularly preferred design variant, a plane is defined in each case between the steering knuckle, the front rubber-solid material bearing and the spring centroid or else between the steering knuckle, the rear rubber-solid material bearing and the spring centroid. Here, the radial direction of the respective rubber-solid material bearing lies normally with respect to the respectively defined plane.

In a further preferred design variant of the present invention, the wheel suspension system is a single-shell sheet metal component. Within the scope of the invention, the wheel suspension system is to be understood to mean a suspension component which is attached to the longitudinal swing arm via the coupling according to the invention. The wheel suspension system itself can in turn receive a wheel support or else can directly have a wheel bearing with a corresponding wheel hub for attaching a wheel. The sheet metal component is preferably a shaped component, in particular is configured as a hot formed component or press hardened component. However, it can also be a forged part or else a cast component. The wheel suspension system itself in turn particularly preferably has a flanged region which can be produced in a correspondingly precise manner, for example, by way of post-machining.

The rubber-solid material bearings are particularly preferably configured from two rubber/metal disk arrangements, the rubber/metal disk arrangements being arranged in each case on one side of the wheel suspension system and, together with the latter, being penetrated in a positively locking manner by a threaded bolt. By way of a corresponding arrangement of the rubber/metal disks in the assembly, it is possible to set high axial rigidity with low radial rigidity, which is necessary in an optimum manner for the operating behavior according to the invention of the toe correction.

Within the scope of the invention, the rubber-solid material bearings should be configured with capital Shore hardnesses between 30 and 75. The axial rigidity is preferably to be selected to be 40 times greater than the radial rigidity.

In a further preferred design variant, a rubber/metal disk arrangement is constructed from three metal disks, in each case one rubber layer being introduced between the metal disks. Here, the rubber layer can be vulcanized on, for example, or rubber disks can also be arranged in the assembly with the metal disks. Said disks can preferably also be adhesively bonded among one another.

In a further preferred design variant, the rubber-solid material arrangements are prestressed, the rubber layer being configured so as to project at least in regions with respect to the metal disks. As a result, in particular, high axial rigidities can be set with a low radial rigidity.

In a further preferred design variant, a wheel support can be screwed to the wheel suspension system, the wheel support preferably being adjustable relative to the wheel suspension system. It is possible here to set production tolerances of the torsion beam axle, the wheel suspension system or else the suspension system by way of presetting of toe and camber of the wheel support with respect to the wheel suspension system. During the operating behavior itself, the wheel suspension system and the wheel support are configured as a unit with shear stiffness. In a further preferred design variant, the wheel suspension system can be adjusted with respect to the longitudinal swing arm, preferably via an eccentric offset of the ball joint. It is possible here to perform a toe and/or camber correction via the elastically mounted wheel suspension system. Via this, furthermore, the intensity of the toe correction which is set in the operating behavior, in relation to the compression or rebound travel, can be set in such a way that no relative toe correction values are set, but rather that they result virtually exclusively from the suspension kinematics of the torsion beam axle.

Figure 2:
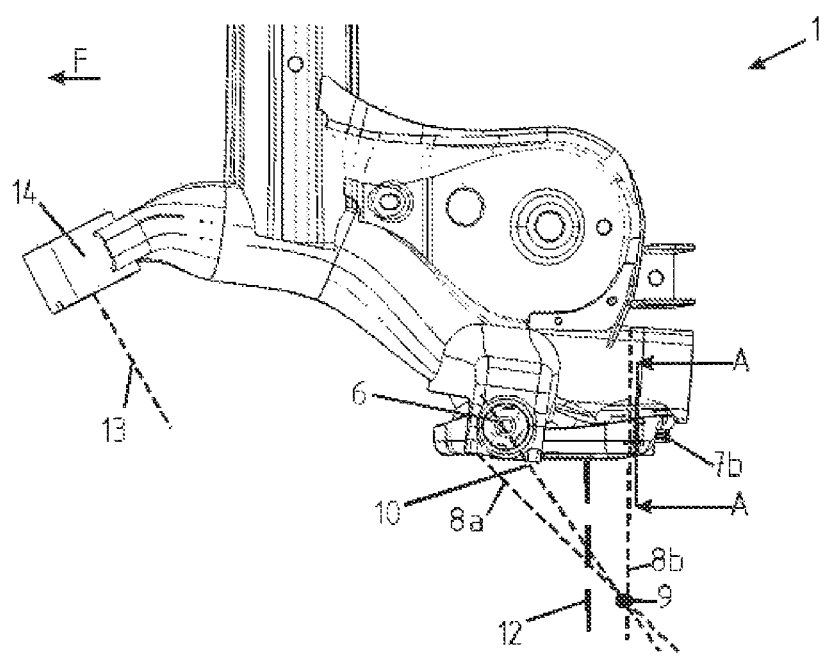
Figure 3:
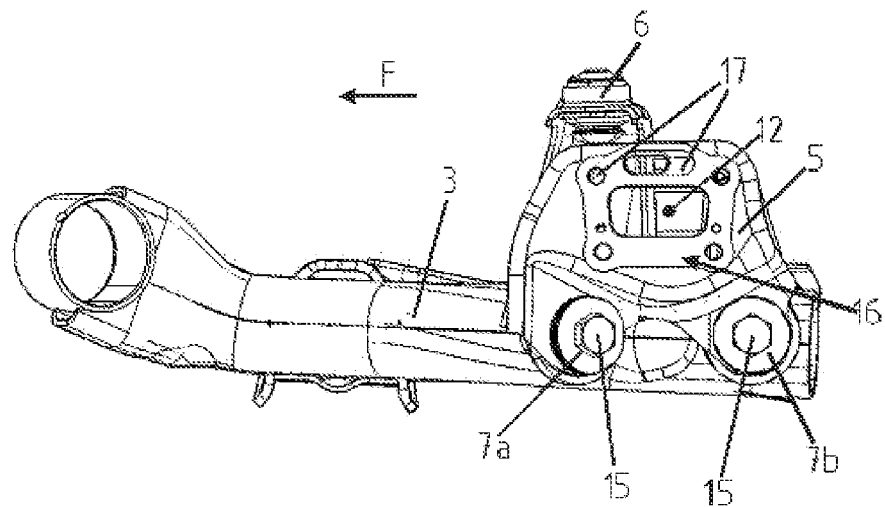
Figure 4:
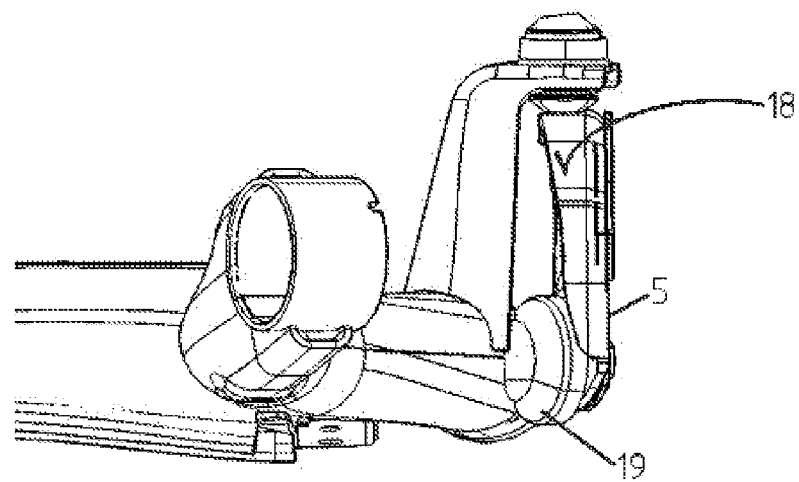
Figure 5:
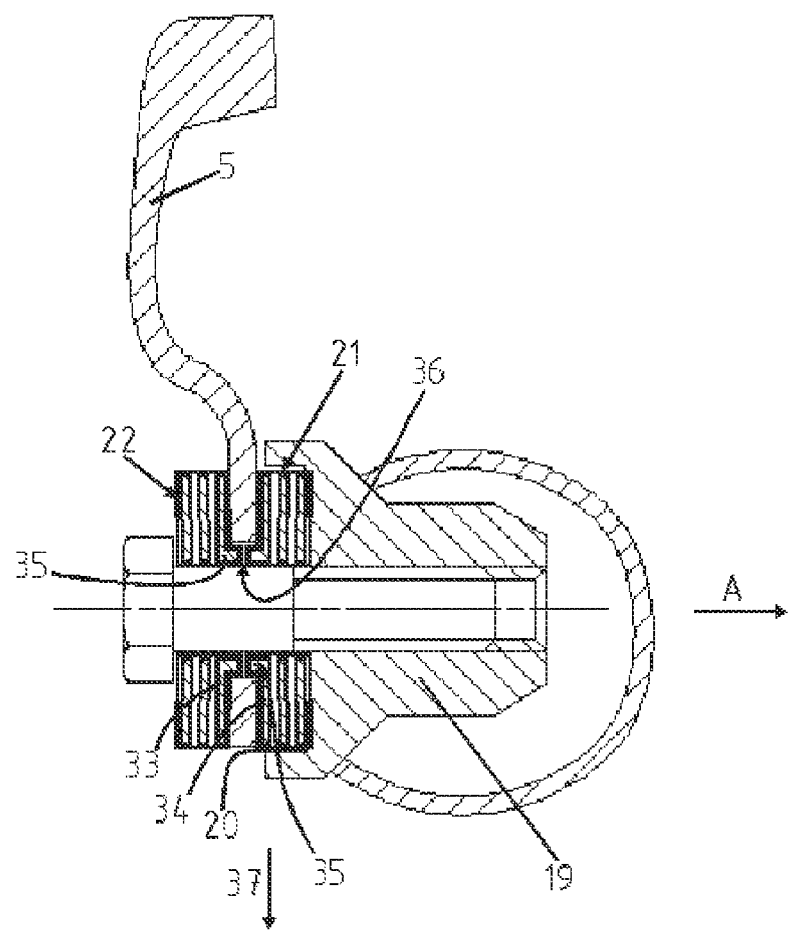
Figure 6:
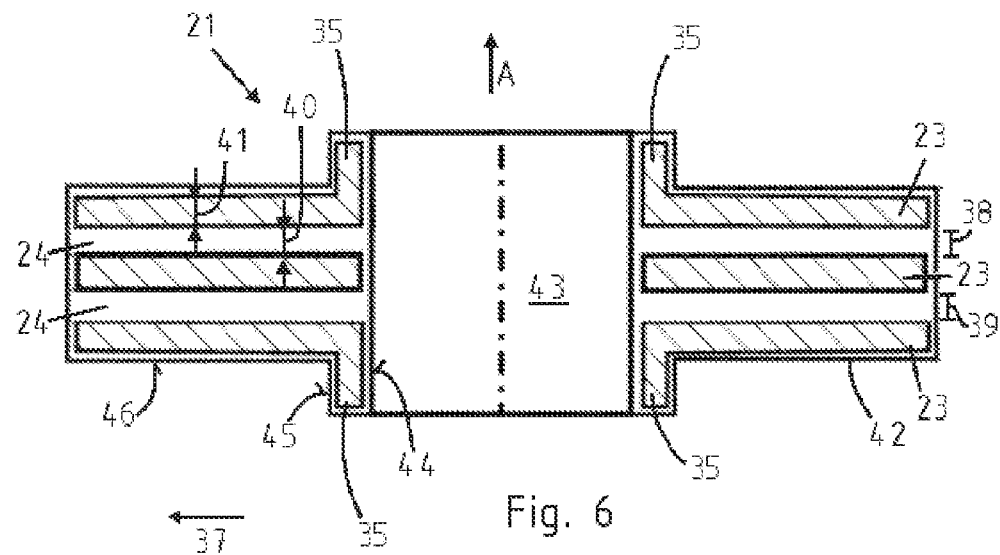
Figure 7:
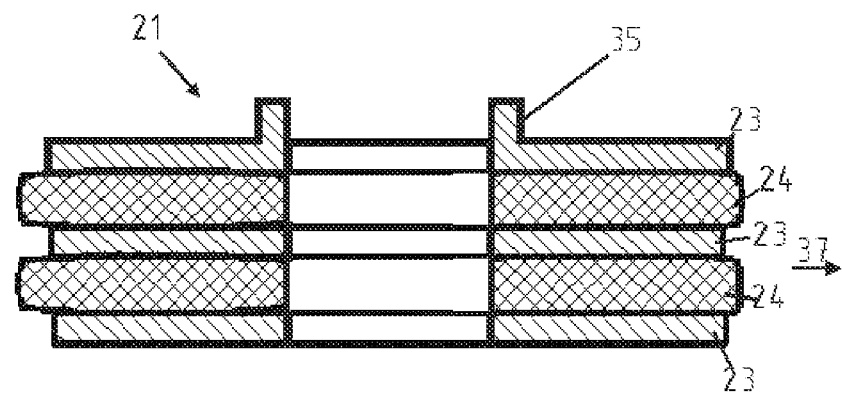
Figure 8:
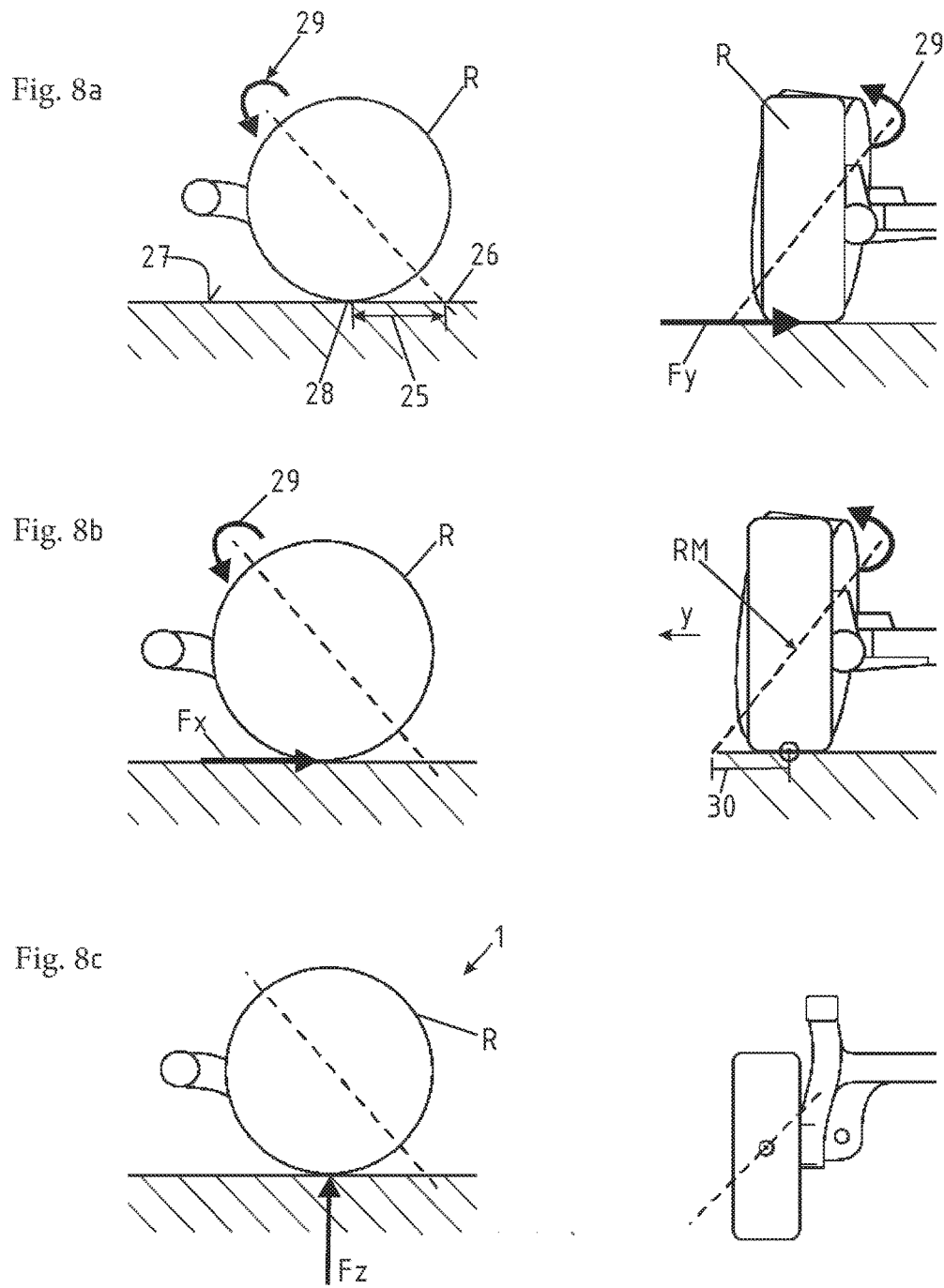
Figure 9:
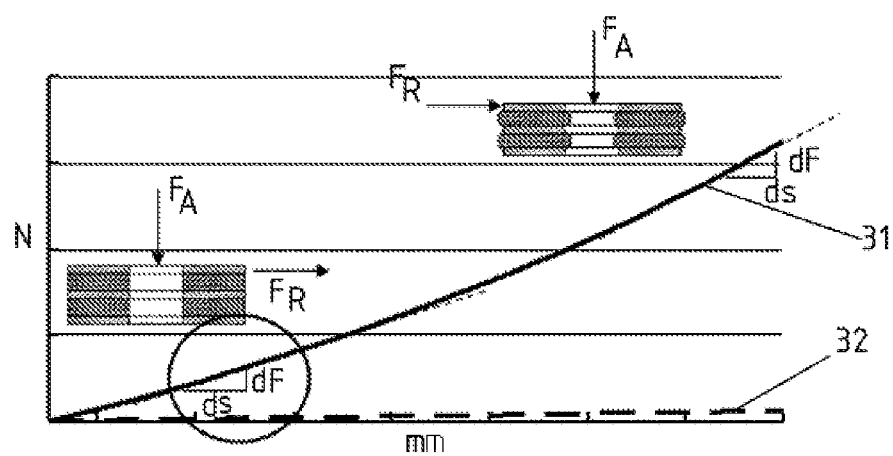

For example, it is therefore possible to use a rear axle construction, in commercial vehicle construction, in the case of which rear axle construction mass differences of the unladen weight of the motor vehicle of up to 1000 kg can occur as a result of different bodies of the commercial vehicle. Accordingly, a toe correction adaptation has to be performed individually for each body variant. Further advantages, features, properties and aspects of the present invention are a constituent part of the following description. One preferred embodiment is shown in the diagrammatic figures, which serve for simple understanding of the invention and in which:

FIG. 1 shows a motor vehicle axle according to the invention with a perspective view of the wheel suspension system, FIG. 2 shows the motor vehicle axle in a plan view, FIG. 3 shows the motor vehicle axle in a side view, FIG. 4 shows the motor vehicle axle in an end view, FIG. 5 shows a sectional view through a fastening means according to the invention of a rubber-solid material bearing according to the sectional view A-A from FIG. 2, FIG. 6 shows a rubber-solid material bearing arrangement, FIG. 7 shows a metal bearing arrangement with prestress, FIGS. 8*a*-8*c* show various driving influences on the wheel, and FIG. 9 shows a spring characteristic curve of the rubber-solid material bearing arrangement.

In the figures, the same reference numerals are used for identical or similar components, even if a repeated description is dispensed with for reasons of simplification.

FIG. 1 shows a motor vehicle axle 1 according to the invention which is configured from a torsion profile 2 with a longitudinal swing arm 3 which is coupled thereto. At the end 4 of the torsion profile 2, a wheel suspension system 5 is elastically coupled according to the invention via a steering knuckle 6 and two rubber-solid material bearings 7. The rubber-solid material bearings 7*a*, 7*b* in each case have a longitudinal axis 8*a*, 8*b* which intersect at a spring centroid 9 outside the motor vehicle in relation to a motor vehicle coordinate system. The spring centroid 9 and the steering knuckle 6 form a virtual steering axis 10, about which a wheel (not shown in greater detail here) pivots. Here, the steering knuckle 6 itself has a degree a rotational freedom 11, the degree of rotational freedom 11 rotating about the virtual steering axis 10.

FIG. 2 shows the motor vehicle axle 1 according to the invention in a plan view. It can be seen here that the rear (in relation to the driving direction F) rubber-solid material bearing 7*b* has a longitudinal axis 8*b* which runs such that it is oriented parallel to a wheel rotational axis 12 which is illustrated here in an outlined manner. To this end, the longitudinal axis 13 of the front rubber-solid material bearing 7*a* is at an angle a from the wheel rotational axis 12. Here, the angle a lies accordingly in the XY-plane of the motor vehicle coordinate system with respect to the wheel rotational axis 12. It can likewise be seen in FIG. 2 that, starting from the steering knuckle 6, the virtual steering axis 10 runs through the spring centroid 9.

FIG. 3 shows a side view, in which, in particular, the wheel suspension system 5 becomes discernible. The steering knuckle 6 is arranged above the wheel rotational axis 12 which is indicated in FIG. 3, whereas the rubber-solid material bearing 7*a* is arranged in front of the wheel rotational axis 12 in the driving direction F and the rubber-solid material bearing 7*b* is arranged behind the wheel rotational axis 12 in the driving direction F. The rubber-solid material bearings 7*a*, 7*b* are in each case coupled via threaded bolts 15 to the longitudinal swing arm 3. Furthermore, the wheel suspension system 5 has a flange region 16, to which a wheel support (not shown in greater detail) can be coupled. To this end, the flange region 16 has various assembly openings 17, with the result that the wheel support (not shown in greater detail) can be adjusted.

FIG. 4 shows a front view of the wheel suspension 5 which is mounted elastically according to the invention; it can be seen that both the flexural rigidity and the torsional rigidity thereof are reinforced by a peripheral reinforcing edge 18. Furthermore, receptacles 19 are provided at the ends of the longitudinal swing arm 3, to which receptacles 19 the rubber-solid material bearings which cannot be seen in greater detail here are coupled. Here, the receptacles 19 extend in a funnel-shaped manner, with the result that a bearing area which is as great as possible and is not shown here in greater detail is produced between the receptacle 19 and rubber-solid material bearing 7.

Furthermore, FIG. 5 shows a sectional view according to the sectional line a-a from FIG. 2. It can be seen here that the receptacle 19 has a funnel shape, and has a receiving groove 20 for receiving a rubber-solid material bearing 21 which lies on the inside and an inner rubber-solid material bearing 21. Furthermore, an outer rubber-solid material bearing 22 is shown, the wheel receptacle being arranged in a coupled manner between the two rubber-solid material bearings 21, 22. Both are penetrated by the threaded bolt, with the result that positively locking coupling to the longitudinal swing arm 3 takes place, but an elasticity for pivoting the wheel suspension means remains via the rubber-solid material bearing. Both the rubber-solid material bearing 21 and the rubber-solid material bearing 22 in each case have a collar 35 which is oriented in the axial direction A toward the disk 33 or 34 which lies on the outside in relation to the respective solid material bearing. The collars 35 and the two disks 33, 34 which lie on the outside are shown such that they are oriented toward one another and engage with the collar 35 in sections into an assembly opening 36 of the wheel suspension system 5. This ensures that a positively locking seat of the rubber-solid material bearing 21, 22 is achieved, in particular, in the radial direction 37, and the rubber-solid material bearing 21, 22 therefore cannot slip during operation when carrying out the elastokinematic movement.

FIG. 6 shows a rubber-solid material bearing 21 according to the invention with three disks 23 which are spaced apart in parallel to one another. The disks 23 can be at a spacing 38, 39 from one another, it being possible for the spacings 38, 39 to be identical, but it also being possible for them to be different from one another. The rubber layer 24 is then arranged in each case between the disks 23, the rubber layer 24 having a width 40 in the axial direction A which corresponds to the respective spacing 38, 39. The disks 23 in each case have a width 41, it being possible for all disks 23 to have an identical width 41 or else to have widths 41 which are different from one another. The width 40 is preferably greater than the width 41. However, the width 40 can also have the same size as the width 41 or can be greater than the width 41. The disks 23 themselves can then be configured from a metallic material, in particular steel material, but can also be configured from plastic material. The disks 23 which lie in each case on the outside of said rubber-solid material bearing 21 which is shown in each case have a collar 35. Both collars 35 are deployed so as to point in a manner which is oriented in the opposite axial direction A. The entire rubber-solid material bearing 21 is covered by a rubber jacket 42. Optionally in addition, an opening 43 which penetrates the bearing is likewise covered on its inner circumferential face 44 by the rubber jacket 42. In particular, the outer circumferential face 45 of the collar 35 is likewise covered by the rubber jacket 42. It is therefore possible that, for example, an outer layer 46 of the rubber jacket 42 and/or the rubber jacket 42 are/is vulcanized on the outer circumferential face 45 of the collar 35 in the assembly opening 36 on the wheel suspension system 5.

FIG. 7 shows a design variant of FIG. 6, the respective rubber layer 24 being prestressed here, with the result that it is configured so as to project beyond the disks 23 in the radial direction 37. FIG. 7 has a collar 35 only on the upper disk 23 in relation to the plane of the image and no rubber jacket 42.

FIG. 8 shows three different actions of force on the wheel R having a motor vehicle axle 1 according to the invention. FIG. 8a shows driving around a bend by way of example, a negative trail 25 being configured between the point of intersection 26 of the virtual longitudinal axis 13 and the roadway surface and the wheel contact area. As a consequence of a cornering force action, a rotation of the wheel R about the virtual longitudinal axis 13 into lead takes place.

FIG. 8b shows the motor vehicle axle 1 according to the invention under the action of a braking force Fx. Here, a braking force Fx acts on the wheel R, a rotation taking place about the steering axis as a result of a negative scrub radius 30, configured between the wheel contact point 28 and the point of intersection 26 of the virtual steering axis 10 in the motor vehicle Y-direction Y, with the result that the wheel R experiences a toe-in correction.

FIG. 8c shows the effect of a vertical force Fz on the wheel R of a motor vehicle axle 1 according to the invention. Here, the wheel R does not experience a relative displacement about the virtual steering axis.

FIG. 9 shows a spring characteristic curve of the rubber-solid material bearing arrangement, the solid line showing the profile of the axial rigidity 31 and the dashed line showing the profile of the radial rigidity 32. A progressive increase in the axial rigidity 31 takes place if the axial force action Fa increases, whereas only a linearly progressing, minimal increase in the radial rigidity 32 takes place. Via this, the ratio of radial rigidity to axial rigidity 31, 32 can be influenced by way of the prestress of the rubber-solid material bearing arrangement in the installed state on the axle.

LIST OF REFERENCE NUMERALS

1—Motor vehicle axle
2—Torsion profile
3—Longitudinal swing arm
4—End of 2
5—Wheel suspension system
6—Steering knuckle
7a—Front rubber-solid material bearing
7b—Rear rubber-solid material bearing
8a—Longitudinal axis of 7a
8b—Longitudinal axis of 7b
9—Spring centroid
10—Virtual steering axis
11—Degree of rotational freedom
12—Wheel rotational axis
13—Longitudinal axis
14—Suspension bearing
15—Threaded bolt
16—Flange region
17—Assembly opening
18—Peripheral reinforcing edge
19—Receptacle
20—Receiving groove
21—rubber-solid material bearing
22—rubber-solid material bearing
23—Disk
24—Rubber layer
25—Negative trail
26—Point of intersection
27—Roadway surface
28—Wheel contact point
29—Rotation into lead
30—Negative scrub radius
31—Axial rigidity
32—Radial rigidity
33—Disk
34—Disk
35—Collar
36—Assembly opening
37—Radial direction
38—Spacing
39—Spacing
40—Width of 24
41—Width of 23
42—Rubber jacket
43—Opening
44—Inner circumferential face
45—Outer circumferential face
46—Layer
A—Axial direction
R—Wheel
RM—Wheel center point
Fx—Braking force
Fy—Lateral force
Fz—Vertical force
Fa—Axial force
Fr—Radial force
Y—direction of motor vehicle
F—Driving direction
α—Angle

The invention claimed is:

1. A rubber-solid material bearing for arranging on a motor vehicle axle, comprising:
   at least three disks made from solid material,
   a rubber layer disposed between the at least three disks wherein two of the at least three disks are arranged on the outside in relation to the axial direction of the rubber/solid material bearing,
   an axial bore extending through the outer disks, and
   wherein the two outer disks each includes a collar extending outwardly away from the bearing in an axial direction and bounding the axial bore, and
   wherein the ratio of radial rigidity to axial rigidity lies in the range from 1:30 to 1:100.

2. The rubber-solid material bearing according to claim 1, wherein the at least three disks are equally spaced from one another, or in that the spacings between in each case two disks are different from one another.

3. The rubber-solid material bearing according to claim 1, wherein the solid material is metallic material.

4. The rubber-solid material bearing according to claim 1, wherein the disks are adhesively bonded to the rubber, or in that the rubber is vulcanized on to the disks.

5. The rubber-solid material bearing according to claim 1, wherein the disks are enclosed on the outer side completely by a rubber jacket.

6. The rubber-solid material bearing according to claim 1, wherein the rubber jacket is configured in one piece and from the same material as the rubber layer, or in that the rubber jacket is applied separately.

7. The rubber-solid material bearing according to claim 1, wherein the opening is likewise provided with the rubber jacket on its inner circumferential face.

8. The rubber-solid material bearing according to claim 1, wherein the solid material is steel material.

9. The rubber-solid material bearing according to claim 1, wherein the solid material is plastic material.

* * * * *